Oct. 1, 1940.   P. W. THORNHILL   2,216,505
PISTON AND LIKE PACKING DEVICE
Filed Feb. 10, 1939
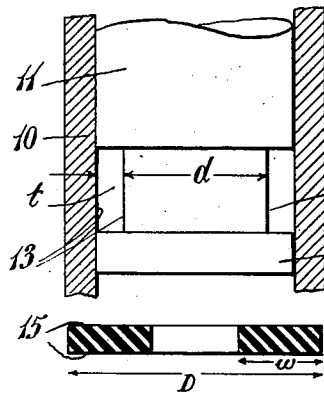
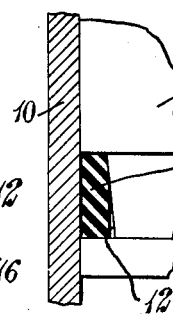
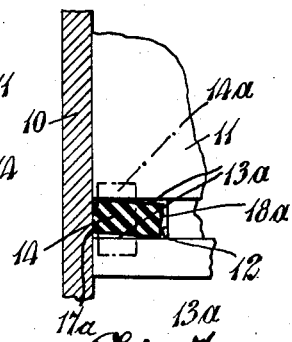
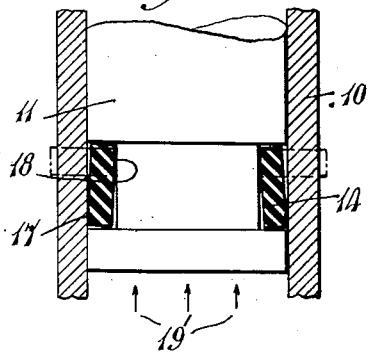
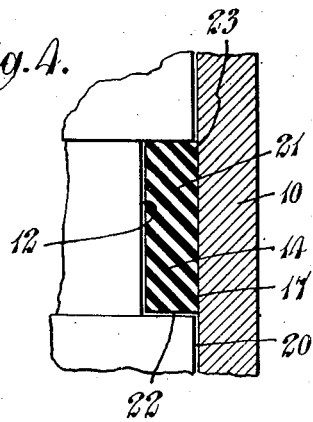
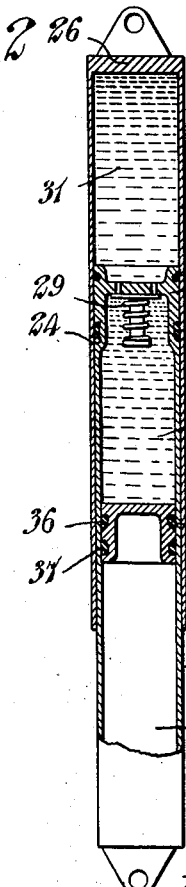
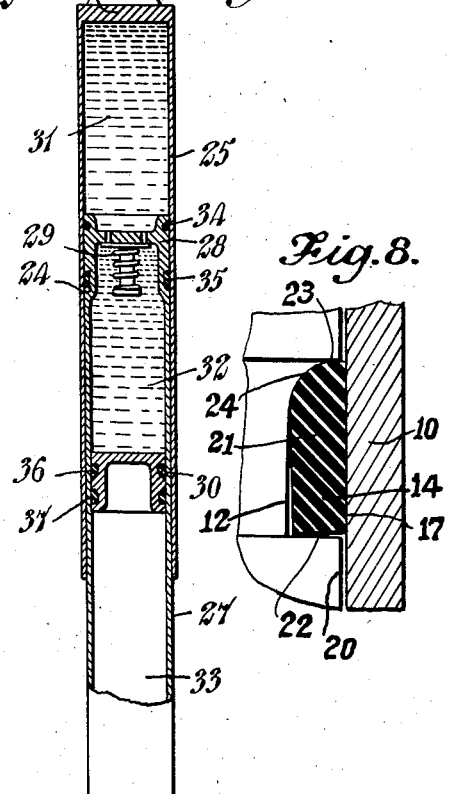
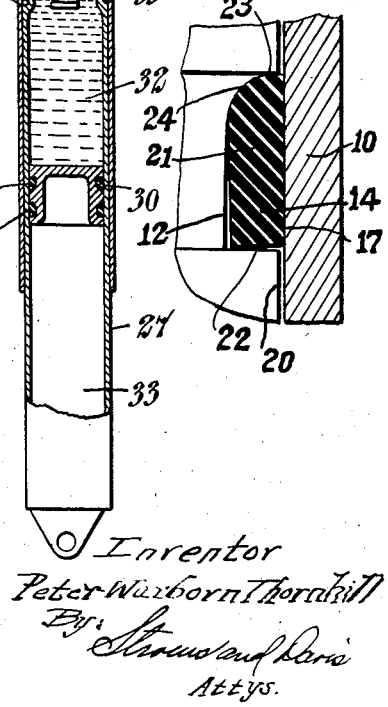
Inventor
Peter Warborn Thornhill
By: Strauss and Davis
Attys.

Patented Oct. 1, 1940

2,216,505

UNITED STATES PATENT OFFICE 2,216,505

PISTON AND LIKE PACKING DEVICE

Peter Warborn Thornhill, London, England, assignor to Automotive Products Company Limited, London, England, a British company, and John Henry Onions, London, England, jointly Application February 10, 1939, Serial No. 255,771
In Great Britain February 15, 1938

9 Claims. (Cl. 309—23)

This invention relates to piston and like packing devices and is especially concerned with that form of packing in which an endless ring composed of rubber or like relatively elastic material is disposed within a groove formed in one of a pair of telescopically fitting members and is arranged to engage the surface of the other member.

It is the object of the present invention to provide an improved construction of packing which is extremely simple to manufacture, but is nevertheless capable of withstanding exceptionally high fluid pressures, and which remains efficiently operative during a long period of service. It also exerts only a low frictional drag.

In accordance with the present invention the pressure packing which is arranged to prevent leakage of fluid between a pair of members, comprises an elastic ring which is non-circular in radial cross-section, and is adapted for insertion into a groove in one of the members. When the packing is inserted it is distorted torsionally so that as it tends to return to its natural shape it presses against both members. The ring is twisted through substantially a right angle so that before assembly the undistorted ring and the groove have substantially the same radial cross-section but the axial dimension of the ring corresponds to the radial dimension of the groove and vice versa. In the present specification the term "torsional distortion" is used to indicate the twisting of the resilient ring, so that what is normally a radial surface on one side of the ring becomes the internal surface thereof, as will be clear from the description which is given hereafter. It is appreciated that when the ring is in position within the groove it is not necessarily subject to torsional stress, the forces acting within the substance of the ring being circumferential and being mainly in tension and/or in compression.

One form of packing according to the invention comprises an elastic ring which is rectangular in radial cross-section, and is inserted in a groove of substantially the same shape and size in cross-section formed in one of the members, the arrangement being such that the groove has the longer sides of its cross-section directed axially, and the ring in its free state has its longer sides directed radially, said ring being torsionally distorted through substantially a right angle during assembling of the packing. Alternatively, the longer sides of the ring cross-section may be directed radially, the ring in its free state having its longer sides directed axially.

In the preferred arrangement part of the ring is in compression and part in tension when the packing is assembled, and this effect may most advantageously be obtained by arranging that the ring in its natural state has an outside diameter which is substantially equal to the sum of the internal diameter of the groove, the radial depth of said groove, and the radial width of the packing ring in its free state.

Preferably the groove, although substantially the same shape in radial cross-section as the ring, is made slightly shallower in radial depth at one end in order to cause the ring to be gripped, the bottom of said groove if desired being slightly inclined with respect to the surface of the ungrooved member so as to bring about the gripping of a packing ring which is located in the groove and is of rectangular cross-section. Further, the axial thickness of the ring in its free state is preferably slightly less than the radial depth of the groove, so that when the ring is inserted in the groove it permits pressure fluid to pass between the bottom of the groove and the ring and so to press the ring against the ungrooved member.

The improved packing is particularly suitable for use between the sliding surfaces of telescopic shock absorbers especially for aircraft, and the invention includes such shock absorbers.

Examples of the invention are illustrated in the accompanying diagrammatic drawing in which Figure 1 is a part-sectional side elevation of a cylinder and plunger grooved to receive the improved packing;

Figure 2 is a sectional elevation of a packing ring in its natural state suitable for the plunger in Figure 1;

Figure 3 is a sectional elevation showing the packing assembled;

Figure 4 is a fragmentary sectional elevation to an enlarged scale showing the effect of applying fluid pressure to the packing;

Figures 5 and 6 are fragmentary sectional elevations of modified forms of packing;

Figure 7 is a sectional elevation through an oleo-pneumatic shock absorber; and

Figure 8 is a fragmentary sectional elevation of a modified form of packing.

In Figures 1 to 4 a fluid tight seal is required between a tubular cylinder 10 and a plunger 11 slidable axially therein. The plunger 11 is, therefore, formed with a groove 12 which is of rectangular radial cross-section, the longer sides 13 being directed axially with respect to the cylinder 10 and plunger 11. A corresponding packing ring 14 is shown in Figure 2, and it will be seen that the shape and size of its radial cross-section is substantially the same as that of the groove 12. In the case of the ring, however, the longer sides indicated at 15 are directed radially and the ring is inserted in place by stretching it over the end portion 16 of the plunger 11 so that it occupies the position shown by the broken lines in Figure 3, and then forcing down the peripheral portion so that the packing ring 14 is disposed wholly within the groove 12. On account of the torsional distortion which is thus brought about the ring 14 always tends to assume the somewhat flat condition shown in Figure 2 with the result that the lower part 17 of its outer surface is pressed firmly against the interior of the cylinder 10, while the upper part 18 of its inner surface similarly engages with the bottom of the groove 12. The dimensions of the ring 14 and groove 12 are arranged so that when the ring is in position there is a very slight endwise and radial clearance, but in Figure 3 this clearance has been exaggerated considerably to show clearly how the ring tends to tilt over. When fluid under pressure acts upon the plunger 11 in the direction indicated by the arrows 19 the effect shown in Figure 4 is produced. Owing to the initial engagement of the packing ring 14 with the cylinder 10 at the position 17 any pressure fluid which passes up to the clearance space indicated at 20 flows along the inside surface of the packing ring 14 and forces the upper part 21 thereof firmly against the cylinder 10. At the same time pressure fluid acting upon the lower end surface 22 of the ring 14 forces the latter upwardly against the opposite wall 23 of the groove 12, and thus effectively prevents the liquid from passing the ring 14 even for relatively high working pressures.

The form of packing ring and groove shown in Figures 1 to 4 will resist most effectively pressure fluid acting in an upward direction, but its resistance to flow in the opposite direction can be considerably enhanced by making the groove 12 slightly shallower at its upper end, such for example by rounding the upper corner as indicated at 24 in Figure 8. The section of the packing ring is rectangular as before and this rounding has the effect of placing the upper part of the packing ring always under a slight degree of radial compression, thus ensuring that said upper part is continually in contact with the cylinder 10. A similar effect may be obtained by making the bottom of the groove 12 slightly oblique with respect to the cylinder 10 so that said groove is somewhat trapezoidal in cross-section as will be seen in Figure 5. The radial width of the groove at its upper part is made slightly less than the corresponding measurement of the ring, so that when the latter is in position its upper part is gripped between the bottom of the groove 12 and said cylinder 10. The packings shown in Figures 1 to 5 are found to have an exceptionally small frictional drag when the fluid pressure is low.

In all cases it is desirable that when the ring is in position part of it should be in circumferential tension and part in circumferential compression, and this effect can be obtained by making the outside diameter D (see Figures 1 and 2) of the ring when in its natural state substantially equal to the sum of the internal diameter $d$ of the groove 12, plus the depth $t$ of said groove, plus the radial width $w$ of the ring 14 in its free state.

Figure 6 shows a somewhat modified arrangement in which the groove 12 in the plunger 11 is again rectangular, but in this case its longer sides 13a are directed radially. The packing ring 14, therefore, has a cross-section when in its natural state of the form indicated by the broken lines 14a, and in assembling the packing the ring is torsionally distorted so that its outer part 17a bears firmly against the cylinder 10. The inner curved surface 18a can be entirely free of the bottom of the groove 12 as shown.

Figure 7 shows the application of the invention to an oleo-pneumatic telescopic shock absorber of the well known form comprising a cylinder tube 25 which is closed at its upper end 26 and is fitted with a slidable plunger tube 27, this being closed at its lower end. The upper end of the plunger tube 27 has a piston head 28 fitted with a valve device 29 used for damping purposes, and said plunger 27 also carries a floating piston 30 serving to separate liquid in the spaces 31 and 32 from compressed air or gas in the space 33. The piston head 28 has a main packing ring 34 but is also fitted with a packing ring 35 which is arranged in the manner shown in Figure 4, the lower wall of the groove being curved as indicated at 24. Also the floating piston 30 has two packing rings 36 and 37 of similar form, the curved edges of the grooves in these cases being the lowermost and the uppermost respectively.

The forms of packing device shown in the drawing are equally applicable, of course, to cases where the groove is provided in the wall of the cylinder or equivalent, the plunger or equivalent being ungrooved. Moreover, either general form of packing can be used for closure plugs and like fitments where relative movement of the parts does not normally take place, although a fluid tight seal is necessary. It will be apparent that the same principle of torsionally distorting the packing ring through a right angle can be applied to cases where an annular seal, surrounding a port for example, is required between a pair of flat sliding surfaces or even between a pair of relatively movable cylindrical or spherical surfaces.

In carrying out the invention cross-sections of ring and groove other than rectangular can be employed, and in fact any non-circular cross-section can be used provided that the ring is torsionally distorted through substantially a right angle when the packing is being assembled. For example, the radial cross-section of both the ring and the groove may be in the form of a semi-circle, the diametral boundary of the groove cross-section being directed axially of the cylinder and piston, while the corresponding surface of the ring when the latter is in its free state would be directed radially.

The term "ring" in the present specification is intended to be regarded widely as covering an endless band of circular or any other shape. The improved packing can obviously be employed between telescopically fitting members of polygonal or other non-circular cross-section. The rings can, of course, very conveniently be cut from tubing or from sheet material or can be moulded.

The improved packing ring is of particular utility in oleo-pneumatic shock absorber legs for aircraft, although it can be used in any case where an annular fluid tight joint is required, instances being in the pistons of hydraulic remote control apparatus and in piston valves generally.

I claim:

1. A packing to prevent leakage of pressure fluid comprising, a pair of telescopic members between which leakage is to be prevented, an endless ring of soft elastic material, such as soft rubber, which ring is substantially rectangular in radial section, a rectangular groove formed circumferentially in one of said members and arranged to be closed by the adjacent surface of the other member, the radial and the axial dimensions of the groove being substantially equal to the axial thickness and the radial width respectively of the ring when in its natural unassembled state, and said packing ring being torsionally distorted through a right angle during assembly so that in tending to return to its natural state it presses against the ungrooved member in a substantially radial direction, thereby creating a seal which is augmented by the pressure of the fluid being sealed.

2. A packing to prevent leakage of pressure fluid comprising, a pair of telescopic members containing a fluid the leakage of which is to be prevented, an endless ring of soft elastic material which is substantially rectangular in radial cross section, and an endless circumferential groove in one of said members, which groove is in radial cross section of similar rectangular shape to the said ring, but is of slightly larger dimensions, the axial dimension of the groove corresponding to the radial dimension of the cross section of the ring in its natural state, the ring during assembly being torsionally distorted through substantially a right angle, the ring pressing against the bottom of the groove at that margin of the groove remote from the fluid pressure intending to return to its natural state.

3. A packing to prevent leakage of pressure fluid comprising, a pair of telescopic members between which leakage is to be prevented, an endless ring of soft elastic material which is substantially rectangular in radial cross section, and an endless circumferential groove in one of said members, which groove in radial cross section is of a substantially similar rectangular shape to the ring with the axial dimension of the groove corresponding to the radial width of the ring, and said packing ring being torsionally distorted through substantially a right angle during assembly and having that marginal part, which normally presses against the bottom of the groove in tending to return to its natural position, pressed against the ungrooved member by a projection formed in the bottom of the groove in such manner that the ring has one of its natural radial surfaces wholly in contact with the ungrooved member.

4. A packing to prevent leakage of pressure fluid comprising, a pair of telescopic members between which leakage is to be prevented, an endless ring of soft elastic material, such as soft rubber which ring is substantially rectangular in radial section, a rectangular groove formed circumferentially in one of said members and arranged to be closed by the adjacent surface of the other member, the radial and the axial dimensions of the groove being substantially equal to the axial thickness and the radial width respectively of the ring when in its natural unassembled state, and the ring in its natural state having an outside diameter which is substantially equal to the sum of the internal diameter of the groove, plus the radial depth of the groove, plus the radial width of the packing ring in its natural state, the arrangement being such that the packing ring is torsionally distorted through a right angle during assembly so that in tending to return to its natural state it presses against the ungrooved member in a substantially radial direction, thereby creating a seal which is augmented by the pressure of the fluid being sealed.

5. A packing to prevent leakage of pressure fluid comprising, a pair of telescopic members between which leakage is to be prevented, an endless ring of soft elastic material, such as soft rubber, which ring is substantially rectangular in radial section, a rectangular groove formed circumferentially in one of said members and arranged to be closed by the adjacent surface of the other member, the radial and the axial dimensions of the groove being substantially equal to the axial thickness and the radial width respectively of the ring when in its natural unassembled state, and the axial width of the groove being greater than its radial depth, the arrangement being such that the packing ring is torsionally distorted through a right angle during assembly so that in tending to return to its natural state it presses against the ungrooved member in a substantially radial direction, thereby creating a seal which is augmented by the pressure of the fluid being sealed.

6. A packing to prevent leakage of pressure fluid comprising, a pair of telescopic members between which leakage is to be prevented, an endless ring of soft elastic material, such as soft rubber, which ring is substantially rectangular in radial section, a rectangular groove formed circumferentially in one of said members and arranged to be closed by the adjacent surface of the other member, the radial and the axial dimensions of the groove being substantially equal to the axial thickness and radial width respectively of the ring when in its natural unassembled state, and the axial width of the groove being less than its radial depth, the arrangement being such that the packing ring is torsionally distorted through a right angle during assembly so that in tending to return to its natural state it presses against the ungrooved member in a substantially axial direction, thereby creating a seal which is augmented by the pressure of the fluid being sealed.

7. A pressure packing, according to claim 1, wherein the groove is trapezoidal in radial cross-section and has its bottom slightly inclined with respect to the surface of the ungrooved member, while the ring is of rectangular radial cross-section having, when undistorted, an axial thickness in excess of the depth of the groove at its shallowest end.

8. A packing, according to claim 2, in which the cumulative depth of the groove and the clearance between the telescoping members is less than the axial thickness of the ring at the margin remote from the fluid pressure so that the ring is compressed between said shallower margin and the ungrooved telescopic member.

9. A pressure packing according to claim 2, wherein the axial thickness of the ring in its free state is slightly less than the radial depth of the groove, so that when the ring is inserted in the groove it permits pressure fluid to pass between the bottom of the groove and the ring and so to press the ring against the ungrooved member.

PETER WARBORN THORNHILL.